United States Patent [19]

Caridis et al.

[11] Patent Number: 4,554,865
[45] Date of Patent: Nov. 26, 1985

[54] TACO SHELL FORMING AND COOKING APPARATUS

[75] Inventors: Andrew A. Caridis, Foster City; Clark K. Benson, Millbrae; Lawrence F. Klein, Hillsborough, all of Calif.

[73] Assignee: Heat and Control, Inc., San Francisco, Calif.

[21] Appl. No.: 578,319

[22] Filed: Feb. 10, 1984

Related U.S. Application Data

[60] Division of Ser. No. 332,743, Dec. 21, 1981, abandoned, which is a continuation of Ser. No. 578,323, Dec. 21, 1981, Pat. No. 4,510,165.

[51] Int. Cl.[4] ............................................. A47J 37/12
[52] U.S. Cl. ...................................... 99/353; 99/404; 99/407; 99/427
[58] Field of Search ................. 99/353, 404, 407, 409, 99/427, 443 C; 426/438, 439, 502, 505, 509, 510

[56] References Cited

U.S. PATENT DOCUMENTS

| | | | |
|---|---|---|---|
| 1,919,185 | 7/1933 | Chapman | 99/404 |
| 2,112,309 | 3/1938 | Santillan | 99/404 X |
| 2,512,591 | 6/1950 | Alexander | 99/404 X |
| 2,570,374 | 10/1951 | Pompa | 99/427 X |
| 2,603,143 | 7/1952 | Saenz | 99/404 X |
| 2,700,939 | 2/1955 | Liston | 99/443 C X |
| 2,907,268 | 10/1959 | Doolin | 99/404 X |
| 2,967,474 | 1/1961 | Ford | 99/404 |
| 3,132,949 | 5/1964 | Crowe | 99/404 X |
| 3,162,297 | 12/1964 | Leach | 198/792 |
| 3,267,836 | 8/1966 | Yepis | 99/404 |
| 3,292,769 | 12/1966 | Zuppiger | 198/792 |
| 3,323,633 | 6/1967 | Engel | 198/455 |
| 3,570,393 | 3/1971 | Schy | 99/404 |
| 3,576,647 | 4/1971 | Liepa | 99/404 X |
| 3,602,130 | 8/1971 | Perez | 99/404 |
| 3,635,638 | 1/1972 | Bryan | 198/459 X |
| 3,680,474 | 8/1972 | Brown | 99/404 X |
| 3,722,400 | 3/1973 | Jiminez | 99/404 X |
| 3,763,764 | 10/1973 | Schy | 99/404 X |
| 3,766,846 | 10/1973 | Jiminez | 99/404 X |
| 3,785,273 | 1/1974 | Stickle | 99/404 |
| 3,795,303 | 3/1974 | Taggart | 198/476 |
| 3,880,065 | 4/1975 | Stickle | 99/404 X |
| 3,928,638 | 12/1975 | Stickle | 426/439 |
| 3,946,655 | 3/1976 | Schy | 99/404 |
| 3,947,241 | 3/1976 | Caridis | 99/443 C X |
| 4,154,153 | 5/1979 | Stickle | 99/404 |
| 4,160,043 | 7/1979 | Stickle | 426/439 |
| 4,167,585 | 9/1979 | Caridis | 426/438 X |
| 4,184,418 | 1/1980 | Jiminez | 99/404 |

Primary Examiner—Billy J. Wilhite
Attorney, Agent, or Firm—Flehr, Hohbach, Test, Albritton & Herbert

[57] ABSTRACT

A machine forms tortillas into cooked taco shells using a conveyor with a plurality of complementary, vertically extending forming elements which shift from a nested to an open condition as the conveyor sprockets are traversed for feeding and discharging the product. On the lower conveyor run the forming elements pass through a channel of cooking oil and then on to a station where cooked taco shells are discharged. A loading conveyor feeds tortillas in a spaced column towards the forming elements and an acceleration conveyor operates between the loading conveyor and forming conveyor for positioning the tortilla for engagement with a forming element.

14 Claims, 13 Drawing Figures

TACO SHELL FORMING AND COOKING APPARATUS

This is a division of application Ser. No. 332,743, filed Dec. 21, 1981, now abandoned, which application was continued by file wrapper continuation Ser. No. 578,323, which has now issued as U.S. Pat. No. 4,510,165.

This invention relates generally to food cooking and more particularly concerns an improved apparatus for forming and cooking taco shells at high speeds by forming the tortilla starting material into a predetermined configuration and maintaining the material in that configuration during the cooking operation.

Taco shell cooking mechanism of various types have been known and used for many years. Among the various devices which were employed are those disclosed in U.S. Pat. Nos. to Saenz 2,603,143, Ford 2,967,474 and Yepis 3,267,836. Each of these devices relates to a means for forming and cooking a tortilla so that it may be used in the preparation of tacos and similar food products. However, each of the devices suffer from the disadvantage that either requires individual loading or has an inherent capacity limitations, or may require an undue volume of cooking oil or fail to meet the high standards for product uniformity required in contemporary production. The device disclosed in the U.S. Pat. Nos. to Stickles, 3,880,065, 3,928,638, 3,785,273 and 4,154,153 concern apparatus having a flexible, pliable belt deformed by a plunger mounted transversely above the belt which clamps the tortilla against the belt forming a pocket in the belt. The mode of operation required intermittent belt action both when the tortilla was initially formed in the pocket and when the tortilla was removed from the belt pocket when the plunger separated from the belt. An intermittent action was also present as the pocket moved through the fryer. An improvement on the Stickles concept minimized the intermittent motion by having a secondary conveyor disposed in the fryer to convey the primary conveyor through the fryer during the fryer operation. This eliminated the intermittent motion during that period. A further limitation of the Stickles equipment was their dedication to a specific size of tortilla and the resulting taco shell. The machines were unable to accommodate interchangeably tortillas of different diameters without substantial redesign. These machines, as well as that disclosed in U.S. Pat. No. to Schy, 3,570,393, were mechanically ingenious but were unduly complex machines to fabricate, operate, maintain and clean. Consequently, their adoption in most cases has been limited to applications where low production may be tolerated in the range, for example, of from 75 to 325 taco shells per minute.

Uniformity of product is a requirement in high volume commercial production of taco shells. This has been difficult to achieve without several operators at a visual inspection station positioned at the discharge of the taco shell forming machine causing high labor cost for operation. This, as well as a loss in scrap taco shells from rejected product, was a negative influence in the overall economy of operation in the prior art taco shell forming machines.

An important object of the present invention is to provide an improved taco shell cooking and forming apparatus or the like which is operable at a high production rate to produce a taco shell of improved quality with a minimum of imperfect taco shell rejects.

Another object of the invention is to provide an improved taco shell cooking apparatus or the like which is adaptable in design over a wide range both to use economically in a low production operation—say, production rates on the order of 75 to 150 units per minute, as well as in a high production operation, production rate for example, 350 to 750 taco shells per minute.

Another object of the invention is to provide a taco shell cooking apparatus wherein the flat tortillas are formed into a U-shape about a vertical plane co-extensive with the path of travel.

Another object of the invention is to provide an apparatus of the type described, adaptable for forming taco shells from a variety of different diameters of tortillas.

Another object of the invention is to provide an improved taco shell forming and cooking apparatus which has a high density of product contained within the mechanism when fully loaded, thereby achieving efficiencies in use of the cooking oil.

Another object of the invention is to provide an improved taco shell forming and cooking apparatus which operates economically at a high turnover rate of cooking oil, thus to achieve a lower free fatty acid content in the cooking oil absorbed by the product, giving a better product shelf life by maintaining a high quality in the oil.

Still other objects of the invention will become apparent to those skilled in the field after having read the following detailed description of a preferred embodiment of the invention which is illustrated in the drawings.

In summary, the present invention comprises apparatus for shaping and cooking food products including a frame having thereon a vat containing a cooking medium through which the food product may be passed for cooking. An endless conveyor is arranged on the frame for carrying the food product through the cooking medium and particularly from a product forming station to a product discharge station. The endless conveyor includes a plurality of forming elements each having complementary concave and convex forming surfaces with the convex forming surface being disposed on the leading edge of each forming element so that when the adjacent forming elements are disposed in a close together relationship the mold surfaces are spaced apart so that the product interposed therebetween is restrained, shaped and carried through the cooking medium. The forming station includes means for supplying sheetlike food elements, one at a time, where each is engaged by the convex surface of the forming element and carried in a downward curve for enclosure within the concave portion of the preceding forming element to be held therebetween during the cooking operation. The products are discharged as the forming elements are spaced apart in an open condition and the products are received on a support mechanism for removal from the apparatus.

The method carried out by the apparatus of the present invention is especially useful for forming a taco shell from a tortilla by preparing a spaced-apart procession of tortillas and moving them in a substantially flat plane. Then accelerating the tortillas individually to a forming station without changing substantially their attitude. The tortilla is decelerated into substantially stationary condition wherein it is folded upon itself and simultaneously moved in the folded condition in a path curved away from the flat plane and placed into a cooking medium and cooked to the product end point, and then removed.

Figure 1:
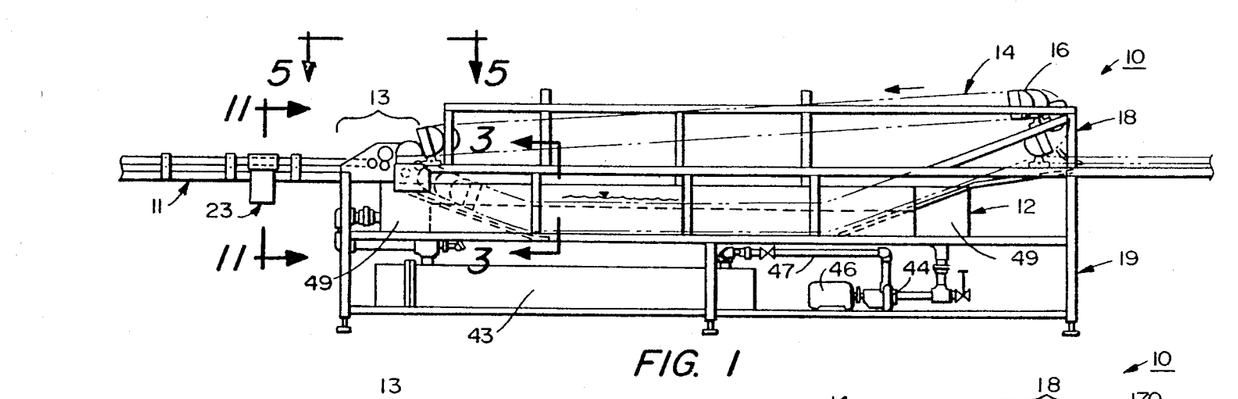
FIG. 1 is a side elevation view of the taco shell forming and cooking apparatus of the present invention.
Figure 2:
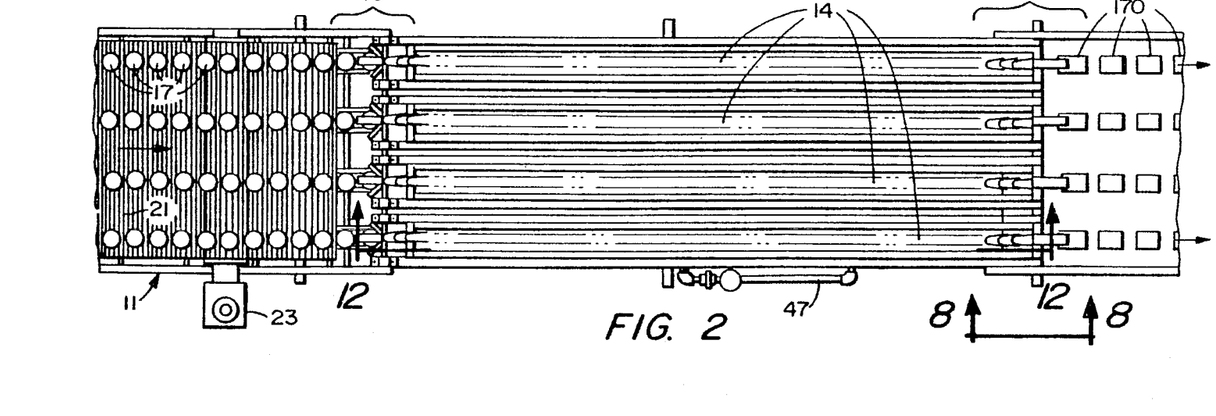
FIG. 2 is a plan view of the apparatus shown in FIG. 1.

The high speed taco shell fryer 10 of the present invention is shown in the drawings and referring particularly to FIGS. 1 and 2 includes a loading conveyor 11, a pan or vat 12 for containing a supply of cooking oil, product forming or loading stations 13, four endless conveyors 14, each equipped with a plurality of complementary forming elements 16 for carrying the tortillas 17 from the forming stations 13 through the pan 12 to an unloading station 18, it being understood the foregoing components are suitably arranged upon a structural frame 19. Although four endless conveyors 14, forming or loading stations 13 and unloading stations 18 are illustrated herein, the invention may be used with the single line of such components or with several conveyors 14 laterally coupled together for conveying the product through the cooking medium. Although the cooking medium described herein is cooking oil, other cooking mediums may be practically used with this invention including those disclosed in U.S. Pat. Nos. 3,947,241 and 4,167,585 issued respectively on Mar. 30, 1976 and Sept. 11, 1979.

Figure 11:
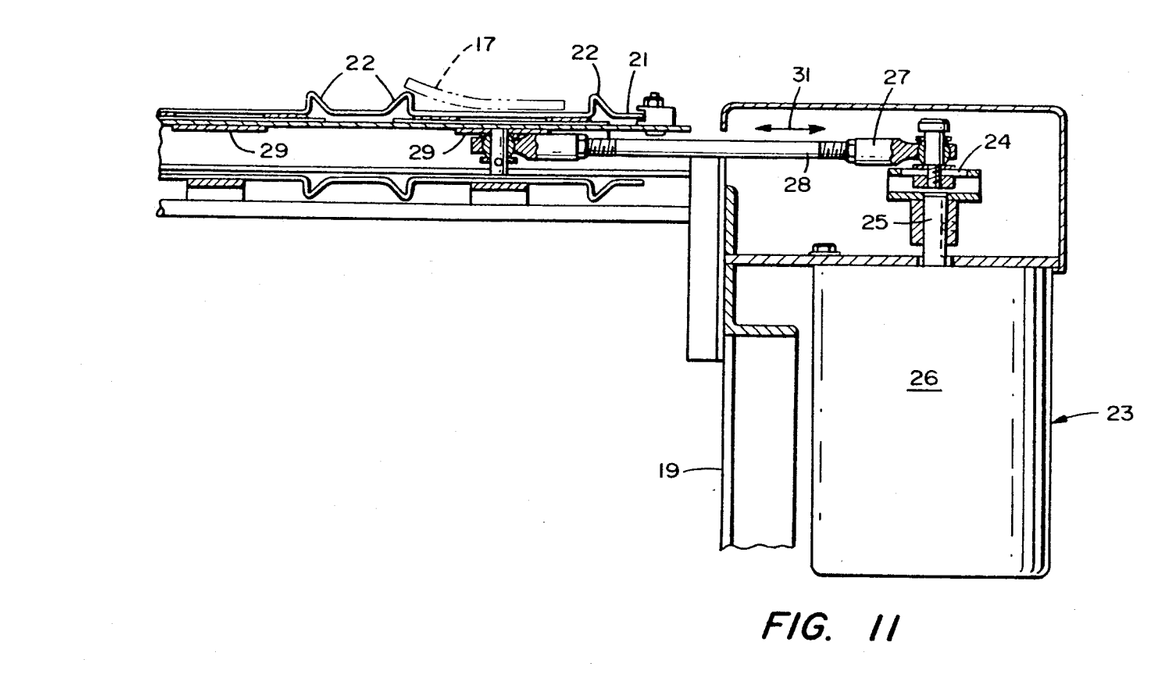
FIG. 11 is an enlarged, fragmentary sectional view taken in the direction of the arrows 11—11 of FIG. 1.

The tortilla carrying loading conveyor 11, shown in FIGS. 1, 2, 5 and 11, includes an endless, flat, flexible wire belt 21 having provisions for maintaining and positioning the tortillas 17 in columns extending in the direction of travel as shown in FIG. 2. These provisions include an arrangement in alternate wire elements (as shown in FIG. 6) of the belt having outwardly projecting shoulders 22 as shown in FIG. 11. The shoulders 22 are spaced apart laterally of the conveying path just slightly farther than the diameter of the tortilla, say 5 to 5⅝ inches. It is recognized that tortillas distort from the ideal diameter of design and take on a variety of eliptical shapes and sizes in ordinary production. The present apparatus accommodates these discrepancies. When disposed between the wire shoulders 22 the tortillas 17 will be maintained in alignment with the forming station as the loading conveyor 11 moves the product forward, to the right as seen in FIGS. 1 and 2. Product re-positioning means 23 serving to jiggle the wire belt 21 is shown in FIG. 11. The objective is to rock the wire belt 21 laterally through the action of an adjustable eccentric 24 rotatably mounted on a shaft 25 driven by a variable speed motor 26. A clevis 27 on the eccentric 24 is attached to a connecting rod 28 which extends beneath the top run of the wire belt 21 to an oscillating plate 29 which when shifted back and forth in the direction of the arrows 31 imparts a jiggling or rocking action to the wire belt 21 to cause any tortilla 17 which may be mispositioned and lodged upon a shoulder 22 (as indicated by broken lines in FIG. 11) to slide into the space between the confronting shoulders 22 and thus be properly positioned for receipt by the product forming station 13.

Figure 5:
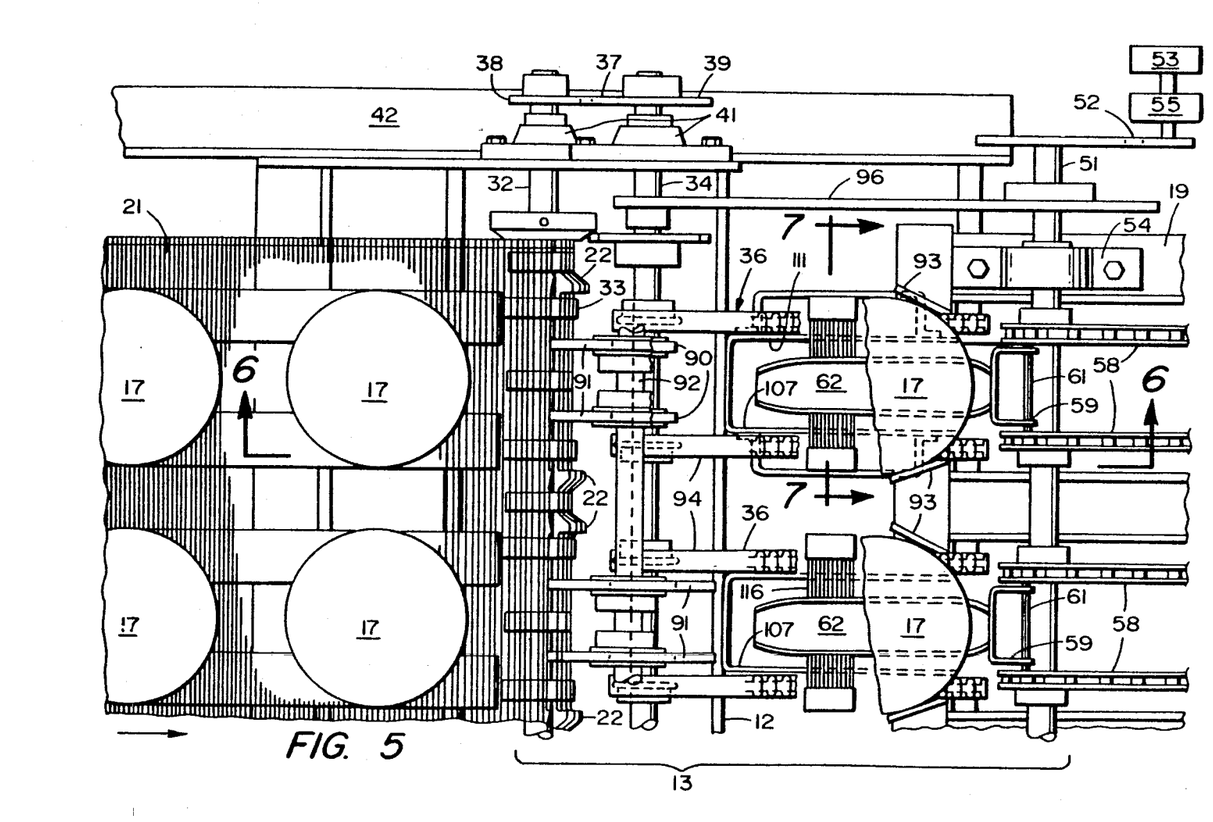
FIG. 5 is an enlarged, fragmentary plan view in the direction of the arrows 5—5 of FIG. 1.
Figure 6:
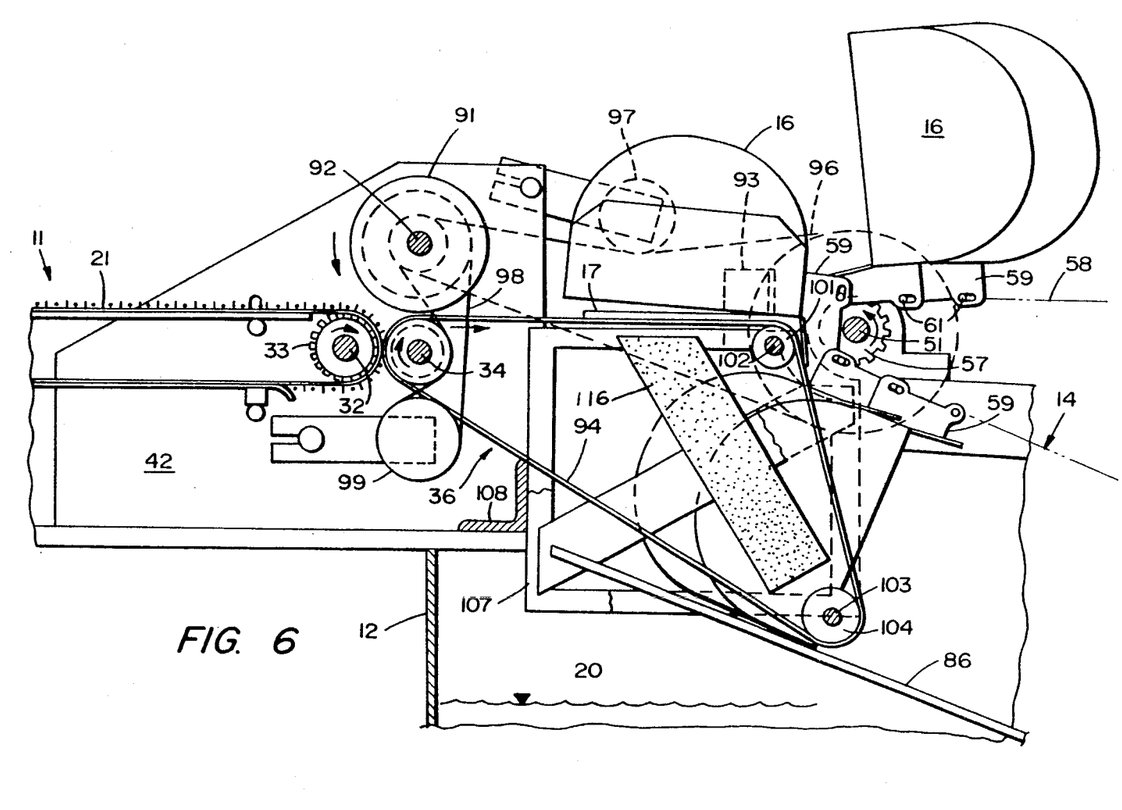
FIG. 6 is a fragmentary, sectional view taken in the direction of the arrows 6—6 of FIG. 5.

The loading conveyor 11 is driven from a shaft 32 equipped with wire belt engaging teeth 33 positioned along the length of the shaft 32, FIGS. 5 and 6. The shaft 32 is driven from a shaft 34 of a product acceleration conveyor 36 arranged in the product forming station 13, FIGS. 5 and 6. The shafts 32 and 34 are driven in the direction of the arrows as shown in FIG. 6 by means of a drive chain 37 reeved about sprockets 38 and 39 on the respective shafts 32 and 34 which are mounted in suitable bearings 41 secured to a frame member 42. Thus as shaft 32 is driven in the direction of the arrow as indicated in FIG. 6, the tortillas 17 are moved from left to right as viewed in FIGS. 2 and 5 and thus advance in orderly rows towards the acceleration conveyor 36 to be described more fully below.

It will be appreciated that the high speed taco shell fryer 10 may be constructed and arranged to accommodate but a single column of tortillas 17 wherein the conveyor belt 21 would be provided with but two pair of shoulders 22 for defining a tortilla receiving channel. Or on the other hand the taco shell fryer 10 may be designed and constructed to receive a plurality of rows of tortillas 17, there being four rows of tortillas illustrated herein. Noteworthy is that the present design is adaptable to form taco shells simultaneously in several rows without encountering mechanical limitations associated with prior machines. The present apparatus retains the qualities and advantages of the design when employing either a single row or several rows of tortilla forming mechanisms.

Figure 3:
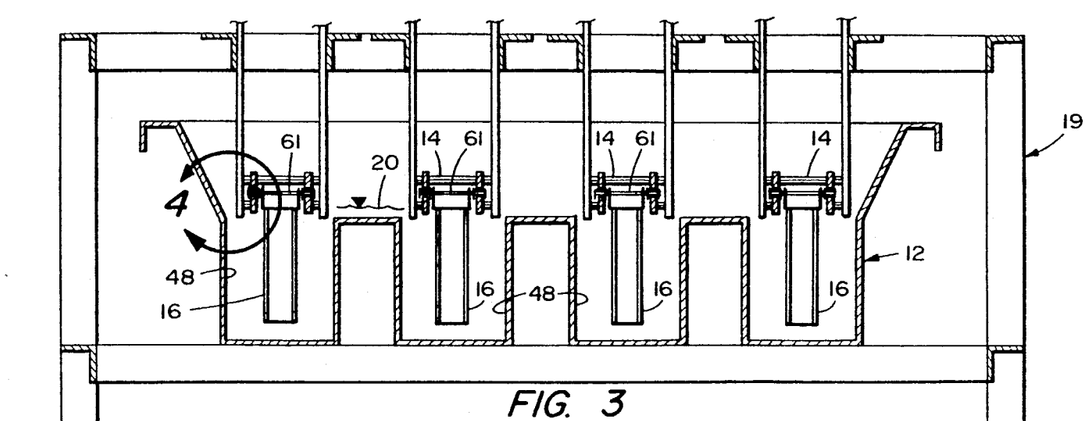
FIG. 3 is a transverse sectional view taken in the direction of the arrows 3—3 of FIG. 1.

The pan 12 is essentially a vat for holding a supply of cooking oil 20 maintained at the cooking temperature—on the order of 275° to 425° F.—by a system including a heat exchanger 43 and pump 44 driven by the motor 46 with the pump 44 circulating oil between the heat exchanger 43 and pan 12 through a suitable piping system 47, FIG. 1. To achieve operation with minimum volume of cooking oil 20 and thereby the advantages of a high turnover rate of cooking oil which gives an improved quality of oil with lower free fatty acid values, the pan 12 is configured as shown in FIG. 3. This includes a plurality of channels 48 which surround the forming elements 16 and through which the forming elements on the endless conveyor 14 are passed with one channel per conveyor system 14, as shown in FIG. 3. The channels 48 are interconnected at each end to a header or manifold 49, FIG. 1, so that a uniform flow of cooking oil may be maintained through each of the channels 48 within the taco shell fryer 10.

The four endless conveyors 14 illustrated herein may be similarly constructed and as mentioned previously, this invention may be practiced through the use of only one endless conveyor 14 and in that situation in the associated loading conveyor 11, pan 12, and forming or loading station 13 will be similarly adapted for the number of conveyors 14 selected for use in the high speed taco shell fryer.

Figure 8:
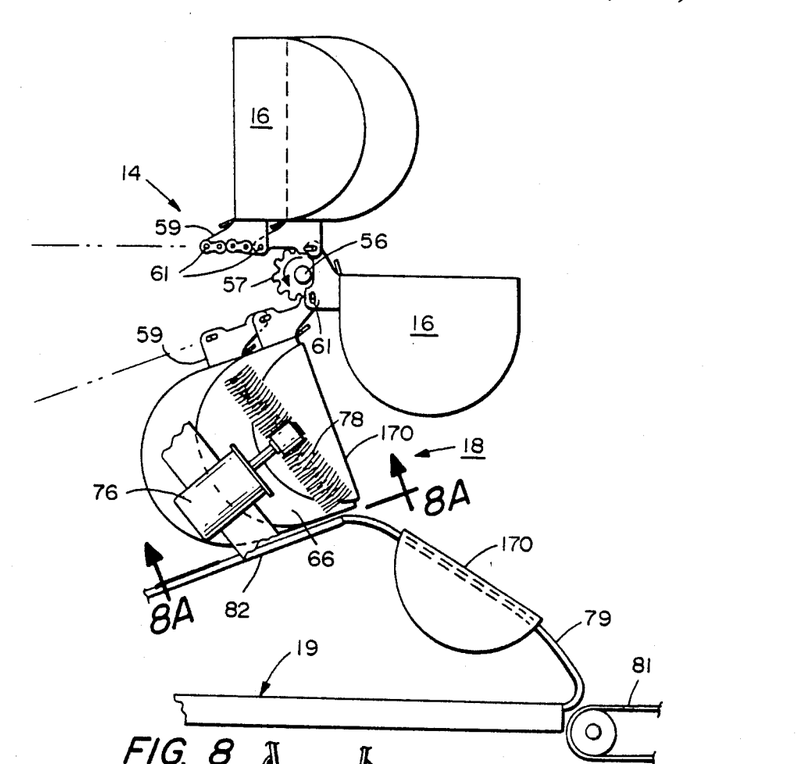
FIG. 8 is an enlarged fragmentary, developed view taken generally in the direction of the arrows 8—8 of FIG. 2.

Referring specifically now to FIGS. 5, 6 and 8, the endless conveyor 14 includes a drive shaft 51 driven through a drive chain and sprocket assembly 52 from a motor 53 coupled to a phase shifting device 55, the shaft 51 being suitably supported by pillow blocks or the like bearings 54 mounted to the frame 19. To carry the forming elements 16 on the conveyor 14, the drive shaft 51 and the idler shaft 56 (FIG. 8) at the opposite end of the unit 10 are each equipped with two spaced apart drive sprockets 57 to cooperate with two endless lineal drive elements, for example roller chains 58 for each conveyor 14. The forming or product carrying elements 16 are mounted to the pair of roller chains 58 by means of a carrier 59 pivotally connected to the two roller chains 58 by a pair of cross rods 61, FIGS. 4, 5, 8 and 9. Each carrier 59 is equipped to receive one cross rod 61 through the aligned circular holes 62 in the tangs 64 and another cross rod through the elongated slot 63 which telescopes over the tang portion of the "following" carrier 59 having a similar pair of tangs 64 equipped with aligned opening 62, FIG. 9. As may be seen from FIGS. 6 and 8, the sprockets 57 are of a relatively small diameter, say, on the order of 2 inches in diameter. The forming elements which pivot into an open condition as their associated cross rods 61 traverse the sprocket 57 at either the loading or unloading station, extend outwardly from the axis of the sprockets 57 a substantial distance, say, on the order of 8-½ inches. This relationship between a sprocket of small diameter and forming elements having a substantial "arm length" provide the opening or "window" for loading a tortilla between consecutive forming elements 16 and for removing a cooked tortilla or taco shell 170 at the unloading station, as shown in FIG. 8.

Figure 9:
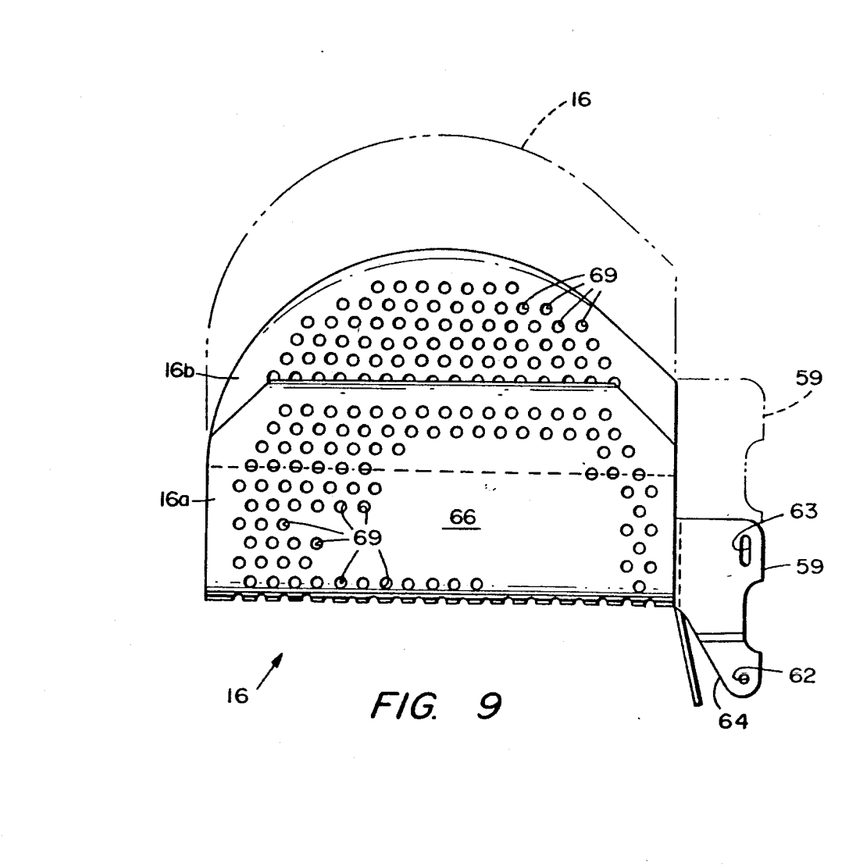
FIG. 9 is an enlarged detail view of the forming elements or molds of the present invention.
Figure 10:
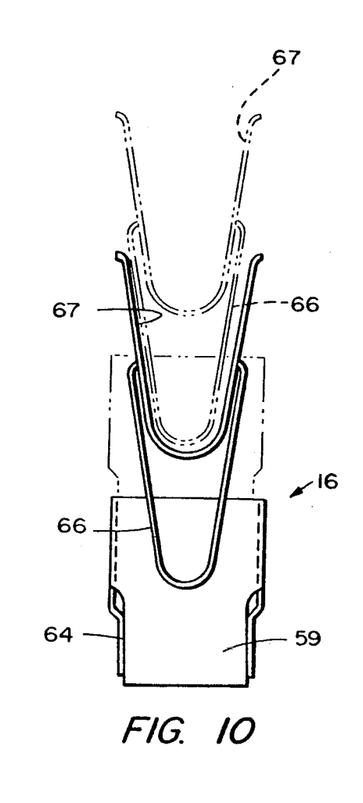
FIG. 10 is a plan view of the elements shown in FIG. 9.
Figure 12:
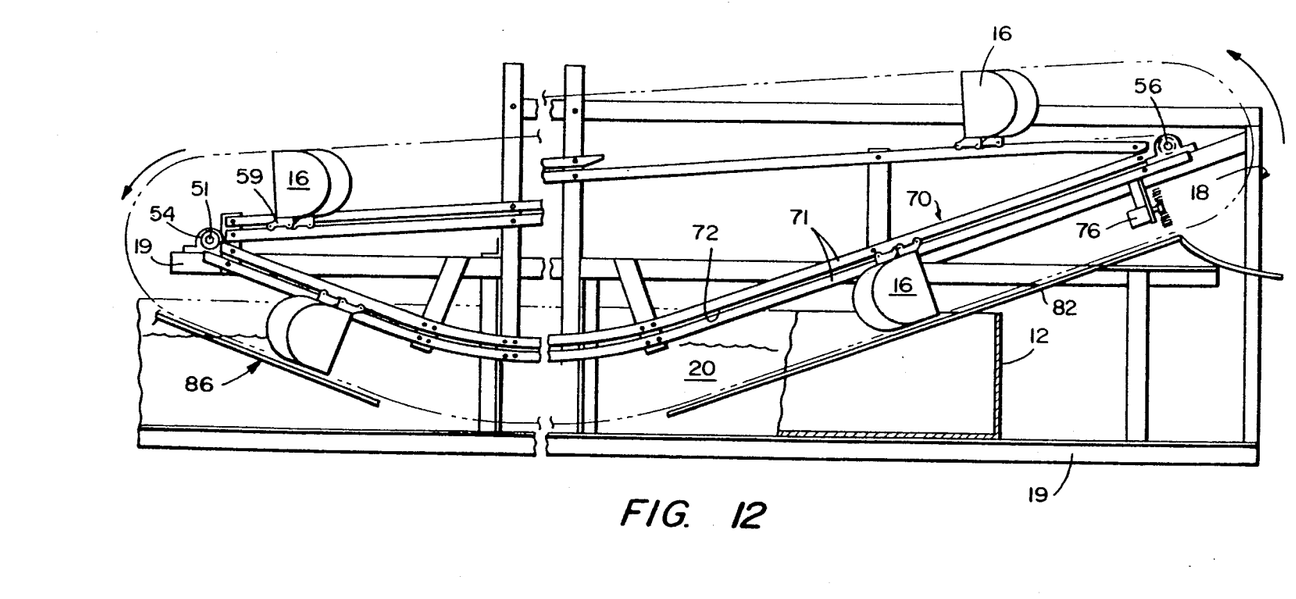
FIG. 12 is an enlarged, fragmentary sectional view taken in the direction of the arrows 12—12 of FIG. 2.

The forming or carrying elements 16 have a general shape of partially opened clam shells and individually are suitably secured to their associated carriers 59 as by welding. Each forming element 16 includes a first body 16a having a generally vertically arranged convex forming surface 66, FIG. 9, and a second body 16b having a concave forming surface 67. The two bodies 16a, 16b are fixedly secured together by welding and arranged as shown in FIG. 9. The trailing edge of the body 16b is curved so that as the forming elements 16 proceed through the forming operation as shown in FIG. 6, the trailing edge as curved provides the maximum "window" for insertion of the tortilla. Referring to FIGS. 9, 10 and 12, the forming elements 16 are so shaped that when the carriers 59 of consecutive elements 16 are arranged so that the aligned holes 62 and slots 63 are disposed substantially in the same plane, there is a product enclosing space provided between the concave forming surface 67 on the forward carrier and the convex forming surface 66 on the trailing or following carrier. This space between the confronting forming surfaces 66, 67, serves to receive and enclose a tortilla to hold it in the folded condition when it is carried through the cooking oil 20. The space between the confronting forming surfaces is slightly wider than the thickness of the tortilla and the forming surfaces are such that the tendency of the product to slide out from the slot or space is minimal due to good surface contact and product buoyancy in the cooking oil 20. It is also apparent that a plurality of apertures 69 are provided in the forming elements 16a, 16b, affording access of the cooking oil to the product as well as to provide escape of water vapor from the product in the cooking operation. Cooking with the product vertically oriented promotes rapid escape of steam and minimizes trapping of moisture vapor and consequent product blistering.

Figure 4:
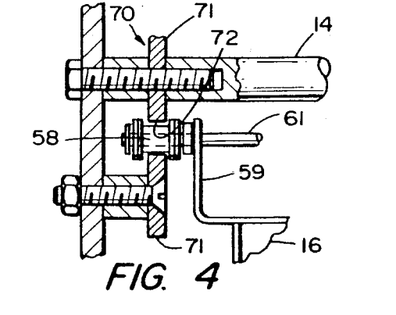
FIG. 4 is an enlarged detail view taken from FIG. 3 at the encircled portion.

Track means 70 are provided on the tortilla shell fryer 10 for maintaining consecutive forming elements 16 in the nested or closed relationship by restraining movement of the roller chain 58 to which the carriers 59 are connected through the cross rods 61, best shown in FIGS. 4 and 12. More specifically, the track means provided for each of the two roller chain sets 58 is a vertically spaced pair of bars 71 defining a guide slot 72 therebetween into which the roller chain links 58 travel from the forming station 13 to the unloading station 18. When the roller drive chains 58 are freed from the guide slot 72, as when the sprockets 57 (FIGS. 6 and 8) are traversed by the roller chain and carriers 59, the forwardmost forming element 16 accelerates as it reaches a point of tangency to the sprocket 57 at a moment when the following forming element 16 remains at the linear speed of the roller chain 58. At this moment the forward carrier 59 and its forming element 16 move away from the trailing carrier 59 and its element thus at the unloading station 18 exposing on the convex forming surface 66 a cooked tortilla now a taco shell 170 (FIG. 8). The elongated aperture or slot 63 in the carrier 59 permits the cross rods spacing to become shorter so as to accommodate the movement of the carriers over the sprockets 57 at each end of the conveyor 14.

Figure 8A:
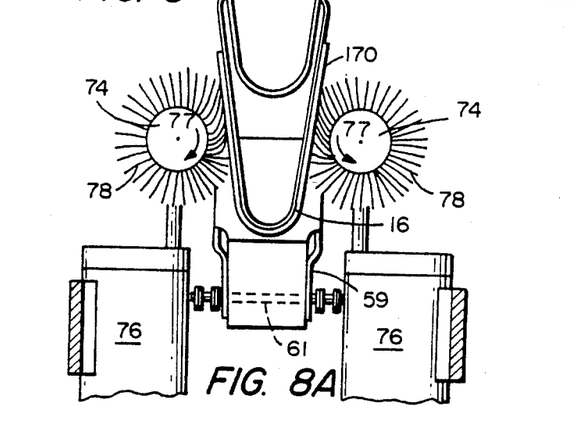
FIG. 8A is an end view taken in the direction of the arrows 8A—8A of FIG. 8.

Considering at this time the discharge or unloading station 18 as shown in FIG. 8, means are provided to ensure that the taco shell 170 is positively disengaged from the convex forming surface 66. To this end there is arranged on each side of the unloading station a power driven array 74 of bristle-like or finger-like elements 78 mounted on the frame 19 with each unit 74 being driven by an electric motor or the like in the direction of the 77 as indicated in FIG. 8A. The bristle elements 78 provide sufficient frictional forces to firmly but gently urge the taco 170 in a forward but downward direction so that a taco shell 170 may be received upon the fixed conveying member 79 for removal onto the discharge conveyor 81, as shown in FIG. 8. Alternatively, a compressed air jet arranged at the unloading station 18 (not shown) could serve to actively disengage the taco shell 170 from the convex forming surface 66. A pan 82 is provided at the discharge or unloading station 18 to return any oil drippings from the taco shell 170 and conveyor 14 back into the cooking vat 12. The drip pan 82 is positioned just below the product conveyor 14 and acts to ensure that tortillas/taco shells do not fall from the enclosure defined by the forming elements 16 should this event for any reason occur.

A guide bar 86, FIG. 6, positioned at the forming station 13 below the lower run of the conveyor 14 serves to limit downward movement of any tortilla which may for some reason project below the lower perimeter of the forming elements 16. Thus, the provision of the bar 86 and the pan 82 obviates the possible clogging or contaminating the cooking medium 20 from product dropping into the cooking oil. It has been observed that the buoyancy of the tortilla in the cooking oil assists in retaining the tortilla between consecutive forming elements in the formed condition.

Figure 7:
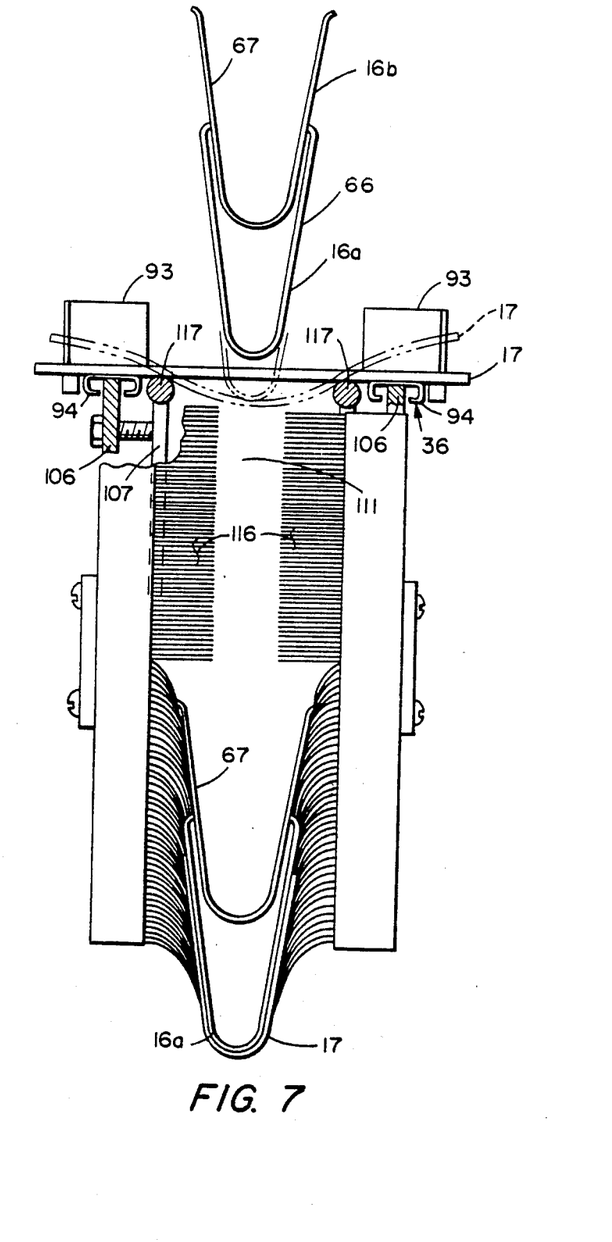
FIG. 7 is an enlarged sectional view taken in the direction of the arrows 7—7 of FIG. 5.

The details of this forming or loading station 13 are shown in FIGS. 5 through 7. Provisions are included to ensure that each tortilla 17 transfers onto the product acceleration conveyor 36 in a direct, positive manner and to this end coacting pairs of acceleration rolls 90, 91 for each conveyor 14 are arranged on shafts 92, 134 the terminal or turnaround portion of the loading conveyor 11, best shown in FIG. 5. The upper and lower acceleration rolls 90, 91 are spaced apart laterally so as to grip the central portion of the tortilla 17, moving it in a straight line onto the acceleration conveyor 36 which maintains and carries the tortilla in accelerated motion until finally the tortilla is arrested by the spaced abutments or stops 93. These project vertically upward from alongside the acceleration conveyor chains or belts 94 and serve to position and maintain the tortilla 17 centered for the ensuing operation. This obviates taco shell "longhorns" where the shells are formed unsymmetrically, one side being longer than the other. The acceleration rolls 90, 91 and the product acceleration conveyor 36 are driven from the shaft 51 of the product forming conveyor 14 through a drive chain 96 which reeves over sprockets on the shaft 92, FIG. 6. An idler sprocket assembly 97 maintains the chain 96 at proper tension. The product acceleration conveyor 36 is driven from shaft 92 through a drive chain 98 which reeves at the lower portion over an idler sprocket assembly 99. The pair of flexible belts 94 of the product acceleration conveyor 36 reeves through sheaves 101 on an upper cross shaft 102 and runs downwardly to a lower cross shaft 103 carrying sheaves 104. As shown in FIG. 7, the belts 94 is supported vertically by a track 106 to define precisely the plane of the belts 94 at the forming station. The cross shafts 102, 103 are supported by a U-shaped sub-frame 107 secured to a cross member 108 which forms a component of the framework 19, FIG. 6.

A guide chute or cavity 111 is arranged in each product forming or loading station 13 to receive therein the procession of forming elements and tortillas as the forming elements 16 and their associated carriers 59 proceed downwardly when the carriers 59 traverse the outer periphery of the sprocket 57, FIG. 6, in the turnaround mode. The consecutive forming elements 16 at turnaround separate to an angular displacement of about 86°, leading edge to leading edge of the forming elements 16 as shown both in FIG. 6 and in FIG. 8. Referring specifically to FIG. 6, a gap of about 33° exists between the trailing edge of the forming element shown in the lower portion of the drawing and the leading edge of the forming element about to engage the tortilla 17. The available time for the tortilla to arrive at the loading position prior to forming is 0.225 seconds with the product conveyor 14 speed at 200 inches per minute.

It has been found desirable to restrain and control the downward movement of the tortilla as it is urged downward and formed against the convex forming surface 66. To this end, the guide chute or cavity 111 is equipped with restraining means comprising an array of bristle-like elements 116 disposed on each side of the vertically downward moving forming element 16, the free ends of the bristles being spaced apart a distance slightly less than the width of the forming element 16. Thus, the nose of the descending forming element urges the tortilla downwardly, as indicated in FIG. 7, into contact with and against the bias of the bristles 116 as the tortilla is moved into the concave forming surface 67. Subsequently the consecutive forming elements are held together in proper forming condition for shaping a taco shell from the tortilla as the associated carrier cross rods 61 enter the guide slot 72 with the chains 58. The bristles or brush-like elements 116 prevent the tortilla 17 from free falling into the guide chute or cavity 111 and so maintain control of the descent of the tortilla being urged into the guide chute or cavity 111 by the convex portion of the forming element. A spaced pair of stationary rods 117 extend longitudinally along the top portion of the guide chute or cavity 111 and establish a contour or guide surface for the descending tortilla 17. The surface of the rods 117 act effectively to relieve the tortilla almost simultaneously from the acceleration belt 94 upon engagement of the tortilla by the nose or leading portion of the forming element 16. This affords additional control to the descending motion of the tortilla.

To operate the high speed taco shell fryer 10 and produce 100 finished taco shells per minute per product conveyor 14 the operator first brings the body of oil 20 contained in the pan 12 to the desired operating temperature for example in the range of 275° to 425° F. The tortilla cook time is about 30 seconds. The heat exchanger 43, pump 44 and motor 46 are energized to realize the desired temperature of the oil 20. The principal drive motor 53 is actuated to set into motion the several conveyors of the unit 10, including the product conveyor 14 which moves at 200 inches per minute carrying 162 elements 16, the loading conveyor 11 which moves at 600 inches per minute, the product acceleration conveyor 36 and the acceleration rolls 91 which move at 1,500 inches per minute, FIGS. 5 and 6. The tortilla re-positioning mechanism 23 is actuated to impart general side-to-side action to the conveyor belt 21 for lodging any mispositioned tortilla 17 between the spaced apart shoulders 22 which define the channels on the wire belt 21 in which the tortillas 17 are conveyed towards the forming station 13.

The 5 inch diameter tortillas 17 are regularly spaced at about 6 inch centers in rows on the wire belt 21 starting from a designated or indexing wire belt element (not shown), but the spacing is not critical in this system because of the speed relationships between the acceleration conveyor 36 and the product conveyor 11 which coordinate with the forming conveyor 14 in a manner such that the variation in spacing between adjacent tortillas 17 may be on the order of plus or minus 1 inch from the 6 inch pitch. The phase shifting device 55 may be actuated to ensure that the product conveyor 11 receives tortillas 17 from the tortilla forming apparatus (not shown) properly timed for the operation of the high speed taco shell forming unit 10. The speed of the acceleration rolls and accelerating conveyor 36 ensures that a tortilla will be lodged at the forming station 13 as the forming elements approach the guide chute or cavity 111 to commence the taco shell forming operation. Mentioned above was the gap between successive forming elements 16 (in the loading position) at the product forming station 13 and in terms of time this was about 0.225 seconds. This gap has been found sufficient to permit accurate lodging of the tortilla against the abutments 93 to be carried downwardly in a curved path into the concave forming surface 67 disposed therebelow.

Once the successive forming elements 16 go into the "nested" or "closed" relationship they are maintained in a relationship tending to hold the tortilla by reason of the drive chains 58 and cross rods 61 being carried smoothly in the slot 72 of the spaced apart tracks 71 as the endless conveyor 14 traverses the oil containing channels 48 in the pan 12. The tracks 71 are directed through a gentle curve downwardly through the cooking medium and then upwardly out of the cooking medium towards the unloading station 18 where the slot 72 ends just before the turnaround sprockets 57 mounted on the idler shaft 56, FIGS. 8 and 12. At the unloading station 18, as the cross rods 61 of succeeding forming elements 16 traverse the turnaround sprockets 57, the forwardmost element 16 accelerates away from the preceding forming element 16 exposing the fried taco shell 170 which rests on the convex forming surface or element 16a whereupon it may be engaged by the rotating brushes 74 and dislodged should it not fall itself by gravity onto the guide bar 79 which serves to guide the taco shell 170 onto the discharge or take away conveyor 81 for packaging, inspecting and the like. The now empty forming elements 16 return over the top of the frame 19 towards the forming station 13 for engaging and forming another tortilla into a fried taco shell.

The taco shell fryer of the present configuration is adaptable from one of several rows of forming conveyors 14 with each row having a capacity on the order of from 75 to 150 taco shells per minute. There is no intermittent motion in the several conveying systems employed in the taco shell fryer 10 in contrast to the prior art systems and the present design permits a long service life with low maintenance. A hood and hoist mechanism, well known in the art (not shown), would be supplied to the unit 10. With substitution of a suitably configured belt 21, tortillas may be accommodated with the present unit with the outer range of tortilla diameter being about ½ inch less in diameter than the vertical dimension of the forming elements 16. Thus a 6 inch diameter tortilla may be accommodated. Tortillas 17 of smaller diameters may be accommodated in diameters as low as 3-½ to 4 inches, with use of a suitable belt 21, the balance of the system remaining the same. This contrasts with the taco forming apparatus of the prior art which generally were limited to accommodating a single size of tortilla.

Although the particular apparatus disclosed here has been more or less directed to an embodiment for forming and cooking taco shells, it is to be understood that the forms can be adapted to other shapes so as to deform any suitable configuration, and the invention is not limited to forming U-shaped articles. The embodiment shown and described above is only exemplary. We do not claim to have invented all of the parts, elements or steps described. Various modifications can be made in the construction, material, arrangement and operation, and still be within the scope of our invention. The limits of the invention and the bounds of the patent protection are measured by and defined in the following claims. The restrictive description and drawings of the specific example above do not point out what an infringement of this patent would be, but are to enable the reader to make and use the invention.

What is claimed is:

1. Apparatus for forming and cooking a food product comprising, a frame, means on said frame to contain a cooking medium through which such food product may be passed for cooking, endless conveyor means on said frame for carrying such food product through said cooking medium, a product forming station on said frame, means for conveying and positioning individual product pieces at said forming station, said conveyor means including a procession of product forming elements mounted thereon for motion between a closed nested position to an open position, each element having complementary convex and concave molding surfaces configured so that when adjacent forming elements are disposed in a nesting relationship the mold surfaces are spaced apart such that the product interposed therein is restrained, shaped and carried thereby through the cooking medium, said conveyor means including means adjacent to said forming station serving to move the forming elements individually from the nested to the open position thus to present to such product positioned at said forming station said convex molding surface serving to urge such product towards said concave molding surface of the preceding forming element; means at said forming station serving to restrain the product movement on its path towards the concave molding surface, guide means co-acting with said conveyor means for maintaining said forming elements in a nested relationship when moving through said cooking medium, unloading station means on said frame, said conveyor means including means adjacent to said unloading station means serving to move the forming elements individually from the nested to the open position thereby exposing the product for removal, and supporting means at said unloading station serving to receive product from said forming elements for removal from said apparatus.

2. The apparatus recited in claim 1 wherein said forming elements are so configured and arranged with respect to said conveyor means to form the product substantially into a U-shape about an axis extending substantially perpendicular to the path of conveyor movement with the folded portion of the product arranged in a vertical plane.

3. The apparatus for forming and cooking a food product as recited in claim 1 wherein means are provided at said unloading station for repeatedly engaging the product for dislodging the same from said forming elements.

4. The apparatus for forming and cooking a food product as recited in claim 1 wherein said forming elements are a pair of curved, similarly configurated, cooperating, apertured mold surfaces.

5. The apparatus for forming and cooking a food product as recited in claim 1 wherein said means to contain a cooking medium includes at least one elongated channel for containing hot cooking oil, said channel serving to receive the forming elements as they move from the forming station to the unloading station.

6. The apparatus for forming and cooking a food product as recited in claim 1 and further including loading conveyor means serving to supply said conveying and positioning means with such uncooked food product, and means on said loading conveyor means serving to maintain such product in a column aligned with respect to said conveying and positioning means.

7. The apparatus for forming and cooking a food product as recited in claim 6 wherein said loading conveyor means, said conveying and positioning means, and said forming element conveyor means are synchronized so as to supply an individual food product piece at the forming station after one forming element has passed therethrough and prior to the next successive forming element being positioned at the forming station to engage the food product.

8. Apparatus to form tortillas into cooked taco shells comprising the combination, a frame, loading conveyor means on said frame including means to position tortillas laterally of the path of conveyor travel serving to maintain the tortillas in an aligned column, a product forming station and a product unloading station on said frame, acceleration conveyor means serving to transfer tortillas individually from said loading conveyor means to said product forming station, a product forming conveyor including a conveyor drive shaft and a conveyor driven shaft, power means serving to drive said loading conveyor means, acceleration conveyor means and said product forming conveyor, said product forming conveyor including spaced-apart pairs of sprockets disposed at said product forming station and at said product unloading station, said sprockets being associated respectively with said drive and driven shafts, spaced apart endless lineal drive means reeved about said spaced sprockets, a plurality of taco shell forming elements mounted to said lineal drive means and projecting outwardly therefrom, each taco shell forming element having complementary convex and concave molding surfaces arranged so that when consecutive forming elements are in a nested relationship the concave molding surface of the forward forming element receives the convex molding surface of the next rearward forming element for forming and carrying the product between such molding surfaces, said forming elements co-acting with the lineal drive means and spaced pairs of sprockets so that as said lineal drive means traverses such sprockets, the forming elements adjacent to the sprockets shift from a nested to an open configuration for the receipt of tortillas at the loading station and for discharge of taco shells at the product unloading station, a vat serving to contain a supply of cooking oil arranged on said frame, said product forming conveyor extending on the lower run through said cooking vat for presenting the forming elements and product enclosed thereby to the cooking oil.

9. The apparatus to form tortillas into cooked taco shells as recited in claim 8 wherein a plurality of product forming conveyors are provided on said frame and said loading conveyor means are equipped to position laterally of the path of travel a plurality of columns of tortillas, each column being aligned with one of said product forming conveyors.

10. The apparatus to form tortillas into cooked taco shells as recited in claim 9 wherein said cooking vat is formed to define a plurality of elongated channels serving to receive the forming elements on the path from the forming station to the unloading station.

11. The apparatus to form tortillas into cooked taco shells as recited in claim 10 wherein said forming elements extend substantially perpendicular to said lineal drive means and project downwardly into said elongated channels.

12. The apparatus to form tortillas into cooked taco shells as recited in claim 8 wherein said forming station is provided with means serving to restrain the movement of the tortilla downwardly on its path towards the concave molding surface of the forming element which has just passed through the forming station.

13. The apparatus to form tortillas into cooked taco shells as recited in claim 8 and further including means at said unloading station serving positively to disengage the cooked taco shell from the associated forming element.

14. The apparatus to form tortillas into cooked taco shells as recited in claim 13 wherein said last mentioned means include power driven means operative on both sides of said product forming conveyor repeatedly to engage the convex portion of the forming element as positioned at the unloading station, and means to receive and support the taco shells as the taco shells are freed from the forming elements.

* * * * *